US012811851B2

(12) United States Patent
Jiménez et al.

(10) Patent No.: US 12,811,851 B2
(45) Date of Patent: Nov. 24, 2026

(54) CONFIGURING ONE OR MORE IOT DEVICES

(71) Applicant: Telefonaktiebolaget LM Ericsson (publ), Stockholm (SE)

(72) Inventors: Jaime Jiménez, Espoo (FI); Aitor Hernandez Herranz, Stockholm (SE); Martina Brachmann, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/687,868

(22) PCT Filed: Sep. 6, 2021

(86) PCT No.: PCT/EP2021/074518
§ 371 (c)(1),
(2) Date: Feb. 29, 2024

(87) PCT Pub. No.: WO2023/030664
PCT Pub. Date: Mar. 9, 2023

(65) Prior Publication Data

US 2024/0356805 A1 Oct. 24, 2024

(51) Int. Cl.
*H04L 41/084* (2022.01)
*H04L 41/5003* (2022.01)
*H04L 67/12* (2022.01)

(52) U.S. Cl.
CPC ........ *H04L 41/084* (2013.01); *H04L 41/5003* (2013.01); *H04L 67/12* (2013.01)

(58) Field of Classification Search
CPC ... H04L 67/12; H04L 41/084; H04L 41/5003; H04L 41/0843; H04L 41/0806; H04L 67/04
See application file for complete search history.

(56) References Cited

U.S. PATENT DOCUMENTS 10,157,058 B2 12/2018 Malladi et al.
10,812,319 B1 * 10/2020 Prakash ................ H04L 41/046
(Continued)

FOREIGN PATENT DOCUMENTS

EP 1901145 A2 * 3/2008 ........... H04L 9/0891
WO 2020253931 A1 12/2020

OTHER PUBLICATIONS

"2-Wire Serial Temperature Sensor", Microchip Technology Inc., No. TCN75A, www.mouser.com, 2006, 33 pages.
(Continued)

*Primary Examiner* — Schquita D Goodwin
*Assistant Examiner* — Linh T. Nguyen
(74) *Attorney, Agent, or Firm* — Murphy, Bilak & Homiller, PLLC

(57) ABSTRACT

Embodiments described herein relate to methods and apparatuses for configuring constrained devices in a system A method in a server comprises obtaining an indication of one or more sensor and/or actuator units at a first constrained device; obtaining first information relating to available settings for the one or more sensor and/or actuator units of the first constrained device, wherein the first information is derived from manufacturer's electronic data sheets, MEDs, for the one or more sensor and/or actuator units; and initiating configuration of at least one of the one or more sensor and/or actuator units based on the first information.

14 Claims, 7 Drawing Sheets

(56) References Cited

U.S. PATENT DOCUMENTS

| | | | | |
|---|---|---|---|---|
| 11,843,678 | B2 * | 12/2023 | Sun | H04L 67/565 |
| 2016/0019294 | A1 * | 1/2016 | Dong | G16H 40/67<br>707/794 |
| 2016/0065653 | A1 * | 3/2016 | Chen | H04L 41/0813<br>715/735 |
| 2019/0102204 | A1 * | 4/2019 | Khosrowpour | G06F 11/302 |
| 2019/0303212 | A1 * | 10/2019 | Bosch | H04L 67/1097 |
| 2019/0364110 | A1 * | 11/2019 | Henry | H04L 67/12 |
| 2020/0117264 | A1 * | 4/2020 | DeBates | H04W 52/0212 |
| 2020/0145288 | A1 * | 5/2020 | Mermoud | H04L 61/5014 |
| 2020/0159723 | A1 * | 5/2020 | Goyal | G05B 15/02 |
| 2020/0159961 | A1 * | 5/2020 | Smith | G06F 21/44 |
| 2020/0177485 | A1 * | 6/2020 | Shurtleff | H04L 63/101 |
| 2020/0381092 | A1 * | 12/2020 | Granvold | G16H 50/30 |
| 2021/0226995 | A1 * | 7/2021 | Lear | G06F 21/64 |
| 2021/0367839 | A1 * | 11/2021 | Vanderveen | H04L 41/0894 |
| 2022/0100802 | A1 * | 3/2022 | Saini | F24F 3/00 |
| 2022/0303261 | A1 * | 9/2022 | Camarillo Gonzalez | H04L 63/0807 |
| 2023/0042610 | A1 * | 2/2023 | Barton | H04L 63/20 |
| 2023/0124811 | A1 * | 4/2023 | Jiménez | G16Y 30/10<br>726/29 |
| 2023/0231925 | A1 * | 7/2023 | Keränen | G06F 16/9538<br>709/223 |
| 2023/0376297 | A1 * | 11/2023 | Ji | G06F 8/65 |
| 2024/0380768 | A1 * | 11/2024 | Gharakheili | H04L 63/1425 |

OTHER PUBLICATIONS

"An Overview of IEEE 1451.4 Transducer Electronic Data Sheets (TEDS)", National Instruments, 2004, 19 pages.
"JSON for Linking Data", JSON-LD.org, 2018, 5 pages.
"Logix 5000 Controllers EDS AOP Guidelines for Logix Designer", Rockwell Automation Publication 1756-PM002C-EN-D, Sep. 2020, Sep. 2020, 89 pages.
"Neosemantics(n10s) User Guide", Neo4j Labs, 2022, 107 pages.
"OpenGIS® Sensor Model Language (SensorML) Implementation Specification", Open Geospatial Consortium, Inc., 2007, 180 pages.
"RDF 1.1 Turtle", W3C recommendation, Feb. 25, 2014, 15 pages.
"SensorML 2.0 Examples", Metadata—Characteristics and Capabilities, SensorML, 3 pages.
"SensorML Ontologies", Botts Innovative Research Inc., 2013, 2 pages.
"Tutorial: Build a Knowledge Graph using NLP and Ontologies", Neo4j Developer Guide, 2022, 28 pages.
Abramishvili, Vazha, "Open Catalog Interface (OCI): Manual for Open Icecat XML and Full Icecat XML", Nov. 3, 2019, 18 pages.
Bormann, C., et al., "Terminology for Constrained-Node Networks", RFC 7228, May 2014, 17 pages.
Niemöller, Jörg, et al., "Cognitive processes for adaptive intent-based networking", Intent-based Networking, Ericsson Technology Review, Nov. 11, 2020, 12 pages.
Shelby, Z, et al., "The Constrained Application Protocol (CoAP)", RFC 7252, Jun. 2014, 112 pages.

* cited by examiner

CONFIGURING ONE OR MORE IOT DEVICES

TECHNICAL FIELD

Embodiments described herein relate to a method and apparatus for use in configuring constrained devices in a system.

BACKGROUND

The "Internet of Things" (IoT) refers to devices enabled for communication network connectivity, so that these devices may be remotely managed, and data collected or required by the devices may be exchanged between individual devices and between devices and application servers. Such devices, are often, although not necessarily, subject to severe limitations on processing power, storage capacity, energy supply, device complexity and/or network connectivity, imposed by their operating environment or situation, and may consequently be referred to as constrained devices. Constrained devices often connect to the core network via gateways using short range radio technologies. Information collected from the constrained devices may then be used to create value in cloud environments.

The constrained nature of IoT devices has prompted the design and implementation of new protocols and mechanisms. The Constrained Application Protocol (CoAP), as defined in RFC 7252, is one example of a protocol designed for IoT applications in constrained nodes and constrained networks. CoAP provides a request-response based RESTful communication architecture between constrained nodes or between constrained nodes and nodes on the Internet. CoAP can easily be integrated to the web and web services by translating CoAP messages to HTTP. Another example of a protocol suited to IoT applications is the Message Queueing Telemetry Transport (MQTT) protocol. MQTT is a lightweight, open source publish/subscribe messaging transport protocol designed for power constrained devices and low-bandwidth, high-latency networks.

The Open Mobile Alliance (OMA) Lightweight Device Management (DM) protocol, also known as the Lightweight Machine to Machine protocol (LwM2M), is a light and compact device management protocol that may be used for managing IoT devices and their resources. LwM2M is designed to run on top of CoAP, and LwM2M is therefore compatible with any constrained device which supports CoAP. In addition, work is ongoing to standardize an MQTT transport solution for LwM2M. LwM2M defines three components:

- An LwM2M Client which contains several LwM2M objects with resources. An LwM2M Management Server may execute commands on the resources to manage the LwM2M client, including reading, deleting or updating resources. LwM2M Clients are generally run on constrained devices. Herein, reference to an LwM2M client may comprise a reference to the LwM2M client or to the constrained device running the LwM2M client.
- LwM2M Management Server: manages LwM2M Clients by sending management commands to them.
- LwM2M Bootstrap Server: is used to manage the initial configuration parameters of LwM2M Clients during bootstrapping of a device.

LwM2M comes with a companion Data Model that defines management objects and application objects as well as their serializations.

A constrained device, such as an Internet of Things (IoT) device, may typically be composed of a processing unit(s), a communication unit(s), and one or more sensor and/or actuator units. These units—also called components—may be provided by different manufacturers.

The manufacturers describe product specifications (e.g. materials used, services provided) requirements, usage instructions, and characteristics of a constrained device or a component in data sheets, user guides, application notes, and technical specifications. This allows developers or device management frameworks to select various configurations and parameter settings for a constrained device and its components.

The aforementioned documentation provided by a manufacturer may be provided in human-readable Portable Document Format (PDFs) or in machine-readable formats such as Open Icecat (OCI) data sheets, Transducer Electronic Data Sheets (TEDSs), Electronic Data Sheets (EDSs), or Sensor Model Language (SensorML). Such documentation that is provided by a manufacturer of a component (e.g. a sensor and/or actuator unit) may be termed a manufacturer's electronic data sheet (MEDS).

U.S. Pat. No. 10,157,058B2 discloses an adaptive self-configuring sensor node. Sensor node software running on the central processing unit can be adaptively reconfigured based on the sensory connected with the node, and using configuration data that is read from a non-volatile memory.

SUMMARY

It will be appreciated that there is a large variety of possible configurations and parameter settings for constrained devices and their various components. In addition, different constrained devices and components from the same or different manufacturers may have different configurations and parameter settings. All of these configurations and parameter settings are described in the MEDSs.

The number of modifications that can be expressed with application layer semantics is limited—typically to the most common ones. As a consequence:

- only a very small subset of all possible configurations and parameter settings a constrained device is capable of may actually be mapped and exposed by the application layer. For example, there is only a limited set of CoAP conditional notification attributes (e.g., a minimum period (pmin) which, when present, indicates the minimum time, in seconds, between two consecutive notifications (whether or not the resource state has changed) a maximum time period (pmax) which, when present indicates the maximum time, in seconds between two consecutive notifications (whether or not the resource state has changes)); and
- the underlying components (e.g., sensor and/or actuator units) of a constrained device may not always be optimally tuned to the current use of the constrained device. Whilst the LwM2M's Object model allows for some expression of properties of the constrained device, it is not as detailed and granular as the MEDS files.

As a result, in most cases, the constrained devices and their sensor and/or actuator units utilise default configurations values, which leads to inefficient running of the constrained devices which may have consequences on the constrained devices themselves (e.g., faster battery depletion) but also on the application utilising the constrained devices due to missing optimization options.

According to some embodiments there is therefore provided a method, in a server, for use in configuring constrained devices in a system. The method comprises obtaining an indication of one or more sensor and/or actuator units at a first constrained device; obtaining first information relating to available settings for the one or more sensor and/or actuator units of the first constrained device, wherein the first information is derived from manufacturer's electronic data sheets, MEDs, for the one or more sensor and/or actuator units; and initiating configuration of at least one of the one or more sensor and/or actuator units based on the first information.

According to some embodiments there is provided a computer program comprising instructions which, when executed on at least one processor, cause the at least one processor to carry out a method as described above.

According to some embodiments there is provided a computer program product comprising non transitory computer readable media having stored thereon a computer program as described above.

According to some embodiments there is provided a server, for use in configuring constrained devices in a system. The server comprises processing circuitry configured to cause the server to: obtain an indication of one or more sensor and/or actuator units at a first constrained device; obtain first information relating to available settings for the one or more sensor and/or actuator units of the first constrained device, wherein the first information is derived from manufacturer's electronic data sheets, MEDs, for the one or more sensor and/or actuator units; and initiate configuration of at least one of the one or more sensor and/or actuator units based on the first information.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Figure 1:
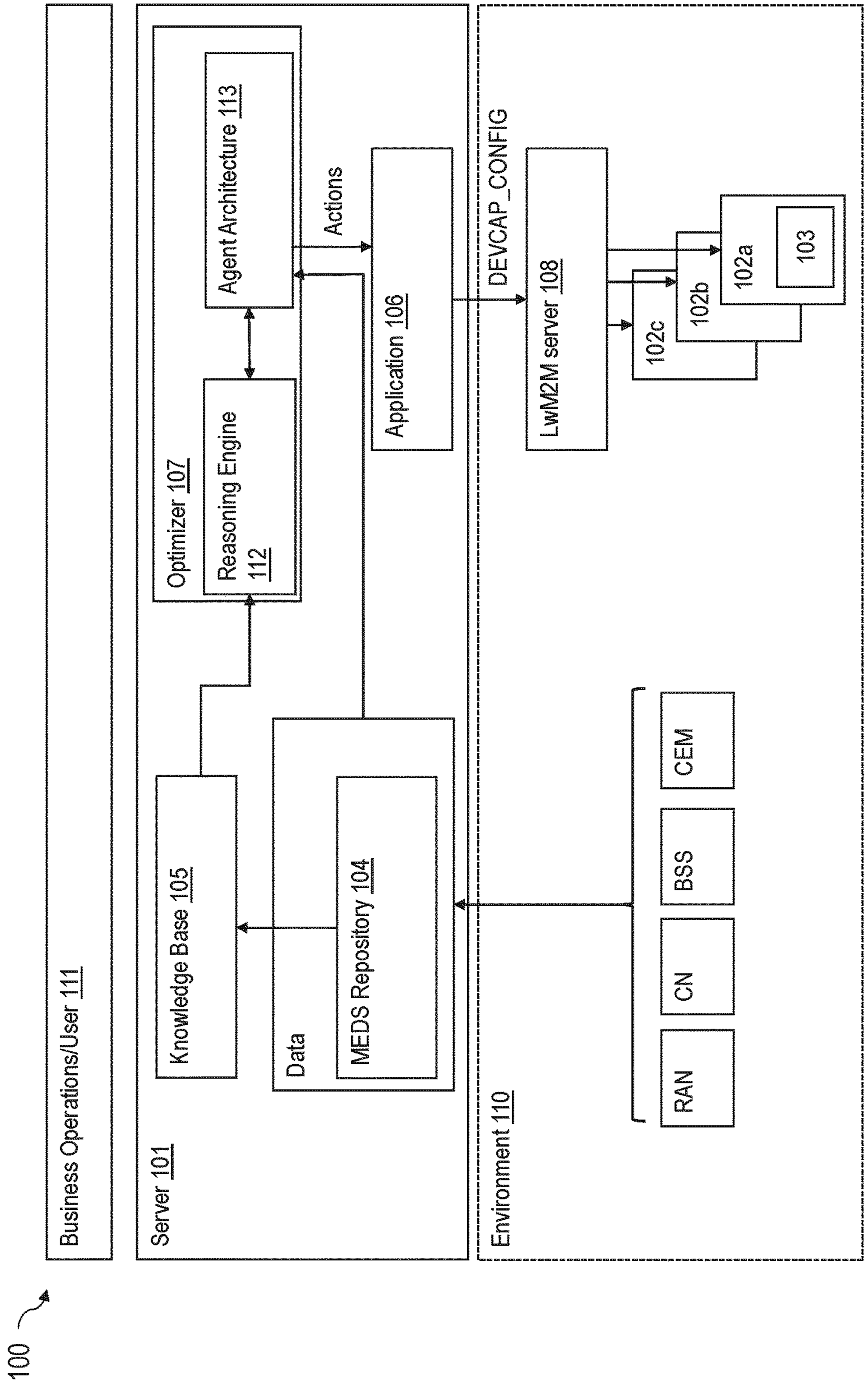
FIG. 1 illustrates an example of a system according to some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAS, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

For the purposes of the present disclosure, a constrained device comprises a device which conforms to the definition set out in section 2.1 of IETF RFC 7228 for "constrained node". According to the definition in IETF RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored, motion sensors for controlling light bulbs, sensors measuring light that can be used to control shutters, heart rate monitors and other sensors for personal health (continuous monitoring of blood pressure etc.) actuators and connected electronic door locks. IoT devices may comprise examples of constrained devices.

Embodiments described herein provide a method and apparatus for configuring constrained devices in a system. In particular, the embodiments described herein make use of the information available in the manufacturer's electronic data sheets MEDSs to provide appropriate and/or optimised configuration for the constrained devices.

Embodiments described herein may make use of a new LwM2M object (referred to herein as DEVCAP_CONFIG or devcap-config) that may be operable to configure a constrained device or component (e.g. a sensor and/or actuator unit) in a constrained device based on one or several MEDSs associated with the constrained device or with a component in the constrained device. The creation of the DEVCAP_CONFIG instance enables each constrained device and its sensor/actuator units to expose the description of the configuration settings and their valid values. The DEVCAP_CONFIG instance also provides a channel through which to modify the configuration and parameter settings on a constrained device.

The new LwM2M Object DEVCAP_CONFIG may be defined such that an instance of DEVCAP_CONFIG is generated per possible tuneable parameter in the constrained device or sensor and/or actuator unit of the constrained device.

An instance of DEVCAP_CONFIG may comprise one or more of the following resources:

1. ConfigName: A human-readable name of the corresponding parameter in the MEDS (e.g., accuracy, precision, sampling rate, resolution, quantification)
2. ConfigValue: An opaque value for the parameter to be currently applied to the device, sensor or actuator (e.g., "1" for a sampling rate of 1 second). The value for ConfigValue may be taken from the set of values described in QuantityRange
3. QuantityRangeType: The enumeration type for the ConfigValue with multiple options (e.g. 'array [float]': 0, 'array [string]': 1, 'range': 2, . . . )
4. QuantityRange: A set of allowed values for ConfigValue that are given by the MEDS for the parameter.
5. ConfigFunction: The name of a function used to tune the parameter as described by the MEDS, and translated into the actual call used in the specific device/sensor/actuators's Software Development Kit (SDK). This function name may be platform-specific and may depend on the underlying Operator System (OS) (e.g. mbed, RIOT, zephyr, arduino, or bare metal).
6. DevCapMgmt: An object link to the LwM2M/15 object. Each instance of DEVCAP_CONFIG may be linked to an instance of the DevCapMgmt Object.

These resources provide a flexible data structure for the configuration of the device sensor/actuator unit.

For clarity, the below is an example of simple serialization of a DEVCAP_CONFIG instance:

[{"bn": "devcap-config/0",
"n":"0", "vs": "sampling rate"},
{"n":"1", "v":10},
{"n":"2", "vs":"array[float]"},
{"n":"3", "vd":[1,10, 100, 1000]},
{"n":"4", "vs":"set_temperature_sampling_rate"},
{"n":"3", "vlo":15:0}]

The above example illustrates the serialization of the sampling rate of a temperature sensor. In this example:

```
ConfigName = "sampling rate"
ConfigValue = "10"
QuantityRangeType = "array[float]"
```

-continued

```
QuantityRange = "[1,10,100, 1000]"
ConfigFunction = "set_temperature_sampling_rate"
DevCapMgmt = "15:0"
```

In this example therefore, the instance 0 of the DEVCAP_CONFIG is setting the "sampling rate" (of the temperature) to "10" which is the sampling rate in Hz. The representation of the possible values for the sampling rate is also provided; in this case an array of float values (1, 10, 100 and 1000). The range of possible values may be provided in the MEDSs. Lastly, the DEVCAP_CONFIG object comprises the function call ("set_temperature_sampling_rate") used in the temperature sensor to configure the changes and an object link to the Device Management Object/15. In this example therefore, the temperature sensor of the constrained device is set to read the temperature at a sampling rate of 10 Hz by the above DEVCAP_CONFIG instance.

A DEVCAP_CONFIG instance for a parameter may also be updated or changed. For example, the following may be used to write to above example DEVCAP_CONFIG instance:

[{"bn":"devcap-config/0",
{"n":"1", "v":100},]

In this example, the DEVCAP_CONFIG instance is changed to update the "sampling rate" (of the temperature) to the value 100 Hz (e.g. 100 samples per second). After this update to the DEVCAP_CONFIG instance, the temperature sensor of the device reads the temperature every 10 milliseconds.

Below are other valid examples of DEVCAP_CONFIG instances:

```
OBJECT: DEVCAP_CONFIG
+--ro DEVCAP_CONFIG* [2]
+--rw instance number          3
+--ro ConfigName               temperature precision
+--rw ConfigValue              5
+--ro QuantityRangeType        array[float]
+--ro QuantityRange            0.1, 1, 5
+--ro ConfigFunction           set_temperature_precision
+--ro DevCapMgmt               '/15/0/'
```

The above example sets the temperature precision of the temperature sensor to the value 5 (e.g. the temperature may be recorded to a precision of 5 degrees Kelvin, Fahrenheit or Celsius). The possible values for the temperature precision are the array of float values [0.1, 1, 5].

```
OBJECT: DEVCAP_CONFIG
+--ro DEVCAP_CONFIG* [1]
+--rw instance number          1
+--ro ConfigName               temperature unit
+--rw ConfigValue              'kelvin'
+--ro QuantityRangeType        array[string]
+--ro QuantityRange            'kelvin', 'celsius', 'fahrenheit'
+--ro ConfigFunction           set_temperature_unit
+--ro DevCapMgmt               '/15/0/'
```

The above example sets the temperature unit of the temperature sensor to the Kelvin. The possible values for the temperature unit are any of Kelvin Celsius and Fahrenheit.

FIG. 1 illustrates an example of a system 100 according to some embodiments. The system 100 comprises a server 101. The server 101 may be operable to configure one or more constrained devices 102*a* to 102*c* in an environment 110. It will be appreciated that the system 100 may comprise any number of constrained devices.

Each constrained device 102*a* to 102*c* may each comprise one or more sensor or actuator units 103. In some examples, the sensor and/or actuator units do not form part of a constrained device but are controlled by a constrained device. Each constrained device may comprise an LwM2M client.

In this example, the server 101 is a distributed component that comprises a plurality of entities. In particular, the sever 101 comprises, a MEDS repository 104, a knowledge base 105, an application 106 (for example an IoT application), and an optimiser 107. IT will be appreciated that these entities may in some examples be comprised within a single network node. An IoT application 106 may for example comprise an application responsible for providing temperature values to a user by utilising one or more temperature senor units 103 at one or more of the constrained devices 102*a* to 102*c*. In some examples, an IoT application 106 may comprise an application that is using information from one or more MEMS accelerometer sensors (ADXL372) 103 at one or more of the constrained devices 102*a* to 102*c*, for example for a gesture recognition device. The application may set requirements on the minimum output data rate, the maximum throughput and latency of the communication, and the maximum energy consumption.

The system 100 may further comprise an LwM2M server 108 configured to communicate with the LwM2M clients 102*a* to 102*c*.

The optimiser 107 may comprise an intent-driven cognitive architecture such as a cognitive layer (CL). Such a cognitive layer may be used to reflect more complex intent requirements. An intent is a formal specification of all expectations, including requirements, goals and constraints given to a technical system. Intents are often dynamic, that is, vary with time based on changing user requirements. An example of a generic intent would be, for arbitrary criteria X and Y and arbitrary numerical values A and B, "the value of X must remain below A and the value of Y must remain above B".

More definite examples, in the context of telecommunications networks, are: "the value of the signal to interference plus noise ratio (SINR) must remain below 0.2 and the network coverage must remain above 90%", and "if the value of the SINR goes below 6, the network coverage must remain above 80% for the next 2 time steps". The intent may therefore specify criteria to be satisfied. The above examples are comparatively simple; those skilled in the art will be aware that more complex intents may be used in some systems.

The optimiser 107 may therefore serve as an interface between users (e.g. customers or business) and operations 111 and an environment 110 (e.g. the environment comprising the constrained devices 102*a* to 102*c*). In the example shown in FIG. 1, the environment 110 is a telecommunications network comprising a radio access network (RAN), a core network (CN), the constrained devices 102*a* to 102*c*, a Business Support System (BSS) and Customer Experience Management (CEM) components. Objectives in a general form, such as "increase Quality of Experience (QoE)", may be provided to the optimiser 107, which may then determine specific actions to be performed in the environment 110 in order to meet the objectives.

As will be described in more detail below, the knowledge base 105 contains an ontology of intents along with domain-specific knowledge such as the current (and in some examples historical) state of the system (referred to herein as the vector state). The knowledge base 105 therefore provides descriptions of objects in the environment 110 and relations between the objects.

The optimiser 107 comprises a reasoning engine 112 which may access the knowledge base 105 to collect knowledge, and one or more agents in an agent architecture 113. The agents in the agent architecture may comprise modules that interact with the reasoning engine 112 to collect the knowledge; and to use that knowledge to find a configuration and/or parameters that will satisfy the intents. The agent architecture 113 may then initiate changes to the environment in order to satisfy the intents. In some example, one agent may be responsible for the inference by applying multi-objective optimization based on the metrics and observations and trying to optimize the intents/goals defined. Another agent may then be responsible for initiating the changes in the environment 110 by transmitting actions to the application 106.

The optimiser 107 may therefore use the knowledge base 105 and serve as the central coordinator function for finding actions to implement in the environment 110, evaluating their impact and ordering their execution.

In operation, the optimiser 107 may, for example, reformulate an objective received from business operations or a user 111 into an intent (using the knowledge base 105), may obtain suggested actions from the agent architecture 113, and may select an action to be implemented in the environment 110.

In some examples, the server 101 (or the optimiser 107) may form part of the environment 110. For example, in the illustrated example of a telecommunications network, the server 101 or optimiser 107 may form part of a network node, such as a core network node (CNN). Alternatively, the server 101 or optimiser 107 may be used to control the environment 110, but may not itself form part of the environment 110.

An existing procedure for determining an action to perform using an optimiser 107 having a CL based architecture is as follows. The optimiser 107 receives an objective from a network operator (or a user), formulates an intent (for example, generates a logical specification from the received objective) and generates one or more criteria to be satisfied based on the intent, the current (and, in some examples, historical) environment status, and, in some examples, a prediction for the future environment status. The criteria may then be delivered to an agent in the agent architecture (which is responsible for proposing an action to be performed on the environment; an example of such an agent may be an ML agent). Each agent may be bound to different parts of the environment. Using the example of a telecommunications network, different agents may be responsible for controlling radio site parameters, core network parameters, and so on. One or more of the agents may be responsible for controlling the constrained devices 102*a* to 102*c*. Where the agents are ML agents, each of these ML agents may host several ML models trained based on a specific purpose (such as, optimizing power, optimizing tilt, and so on). When an agent receives criteria from the reasoning engine 112, it may then propose an action using an equipped ML model (a power optimiser, tilt optimiser, and so on) to satisfy the criteria. An action may then be selected from the proposed actions (e.g. by the CL or another component such as a network controller) and implemented in the environment 110.

The MEDS repository 104 may be configured to store all MEDS relevant to one or more of: each constrained device, each sensor and/or actuator unit; and the application.

Each MEDS may be stored using a specific ontology as an entry in the MEDS repository 104. For example, an ontology may organise the information given in each MEDS. For example, for each individual MEDS file the ontology may organise the information such that the possible values for each parameter (or each tuneable parameter) of the corresponding sensor and/or actuator unit is stored. The ontology may also comprise rules and relationships that limit the way in which these parameters may interact with each other.

The MEDS repository 104 may comprise a relational database, a no-Structured Query Language (SQL) database, or even a graph database.

In some examples, the MEDS repository 104 may comprise a file server organized by the hardware information in the MEDS files, and each of the files in the MEDS repository 104 may comprise a Turtle file or JavaScript Object Notation for Linked Data (JSON-LD) file containing a Resource Description Framework (RDF) serialization of the information in a corresponding MEDS file.

The contents of the MEDS repository 104 may be provided either by the manufacturers of each of the sensor and/or actuator units in the system, or the manufacturers may provide a parsable MEDS file (not based on the ontology) that may then be converted into an ontology MEDS entry for storage in the MEDS repository.

The MEDS repository 104 may therefore allow, from MEDS files, for the extraction and mapping of the intents and sensor/actuator capabilities to be used in the optimiser 107. The optimiser 107 may then be able to provide actions, which may be directly mapped to the constrained devices' DEVCAP_CONFIG instances.

As previously described, the knowledge base 105 may allow for a common understanding (i.e., vocabularies/ontologies) of all the elements involved (e.g., system, sensors/actuators, intents) in a decision for configuring a constrained device. The knowledge base 105 may be seen as a database that contains all the classes, properties and constraints of the different ontologies that are required in a decision and their relationships; the instances/facts that are representing the resources for the application; and the intent definitions.

The knowledge base 105 may acquire the information needed for a particular decision from external databases and repositories, such as the MEDS repository 104.

The ontology definitions may be provided as Turtle RDF file or JSON-LD, to mention some serialization examples for RDF. In some examples, the knowledge base 105 may obtain a minimum set of information (e.g. ontologies definitions) as follows:

- A MEDS ontology definition for the relevant actuator and/or sensor unit e.g. based on SensorML.
- An ontology definition for the constrained device e.g. web of things ontology, Digital Twins Definition Language (DTDL) or One Data Model (OneDM) with the Semantic Definition Format (SDF).
- An ontology definition for any intents, goals, objectives and requirements (in terms of accuracy, latency, energy consumption, communication costs, . . . ). These ontology definitions may be generated from requirements of a given constrained device, or requirements on the application. The intents may be provided by multiple entities for example operators of the constrained devices, businesses utilising or owning the constrained devices, or customer/users of the constrained devices. The intents may be provided to the server 101 via portals or by using application programming interfaces (APIs).
- Metrics or observations of the running system(s) (referred to herein as a vector state of the system) that defines the current state of the system(s). The observations may comprise information from devices, hardware elements, software elements, network components, the application or any other element that may impact the intent. Metrics of the constrained devices may comprise one or more of: CPU/GPU/memory usage, energy consumption, latency/bandwidth in a network link, processing time of a certain function, and device-to-application delay. These metrics may be provided as, for example, a single value, a list of accumulated values for a given interval, or a mean, or a variance of the value for a given interval. Data models like OpenMetrics or OpenTracing may be used to help to unify the metrics and traces collection/exposure. Note that the instances of the metrics and observations may also be stored using an efficient storage, a time-series database, or as streams of data to perform faster actions. Tools like Prometheus are used as Time-series databases with advanced querying mechanisms (PromtQL)

This information may then be imported into the knowledge base 105 with ontologies support. For example, the knowledge base 105 may comprise a graph database (e.g. Neo4j). With the ontologies in place, the knowledge base 105 may import relevant data/instances/facts to define the whole system. The MEDS ontology definitions together with the existing ontologies in the knowledge base 105 allows for a simple and dynamic definition of intents and configuration changes (e.g. intent handling actions) that relate sensor capabilities with other metrics, for example, communication and energy consumption.

The application 106 may be configured to create and/or write to instances of DEVCAP_CONFIG in order to configure the constrained devices 102*a* to 102*c* according to the actions provided by the optimiser 107.

In some examples, the server 101 may further comprise a DEVCAP repository, previously created from MEDS files. A DEVCAP repository may pre-built based on the existing device/sensor/actuator units, and it may map each of the device/sensor/actuator unit capabilities to a predefined DEVCAP-CONFIG instance.

Figure 2:
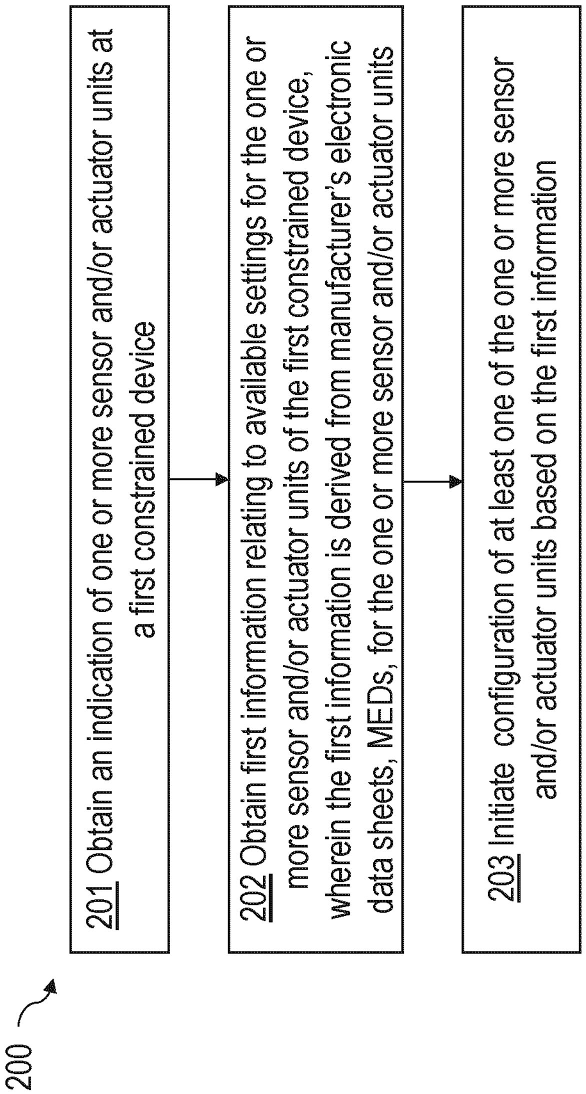
FIG. 2 illustrates a method in a server, for use in configuring constrained devices in a system.

FIG. 2 illustrates a method in a server, for use in configuring constrained devices in a system. For example, the method may be performed by the server 101 as described with reference to FIG. 1. In some examples, the method may be performed by the optimiser 107 as described with reference to FIG. 1.

The method 200 may be performed by a server, which may comprise a physical or virtual node, and may be implemented in a computing device or server apparatus and/or in a virtualized environment, for example in a cloud, edge cloud or fog deployment. The server may comprise one or more nodes or components. It will be appreciated that the different components of the server may be distributed across different nodes.

The constrained devices may comprise LwM2M clients.

In step 201, the method comprises obtaining an indication of one or more sensor and/or actuator units at a constrained device. For example, the server may obtain information identifying what sensor and/or actuator units are in, or controlled by, a constrained device.

In step 202, the method comprises obtaining first information relating to available settings for the one or more sensor and/or actuator units of the first constrained device, wherein the first information is derived from manufacturer's electronic data sheets, MEDs, for the one or more sensor and/or actuator units. For example, the first information may comprise the MEDSs for the sensor and/or actuator units. Alternatively, the first information may comprise ontology definitions for the available settings of the one or more sensor and/or actuator units.

The available settings of the one or more sensor and/or actuator units may for example comprise an indication of possible values for one or more parameters associated with the one or more sensory and/or actuator units. For example, the available settings for the temperature sensor described above may comprise, for the parameter "sampling rate", the possible rates of 1 Hz, 10 Hz, 100 Hz, or 1000 Hz.

In step 203 the method comprises initiating configuration of at least one of the one or more sensor and/or actuator units based on the first information. For example, as described above with reference to FIG. 1, the optimiser 107 may determine actions to be implemented in order to fulfil the intents, and may initiate those actions by transmitting the actions to the application 106. The application 106 may then configure the relevant constrained devices (and their sensor and/or actuator units) by creating or writing to a DEVCAP_CONFIG instance (for example as described above). In some examples, the optimiser 107 performs step 203 by transmitting the first information (or reduced first information as described later with reference to FIG. 4) to the application 106.

In examples in which the method of FIG. 2 is performed by the server 101, step 203 may comprise creating a DEVCAP_CONFIG instance or writing to an existing DEVCAP_CONFIG instance, and transmitting the new or updated DEVCAP_CONFIG instance to the LwM2M server 108.

The method of FIG. 2 allows the server 101 (or the optimiser 107) to tune and configure a constrained device and its sensor and/or actuator unit configurations to fulfil application intents (which may, for example, be related to energy, precision, accuracy, bandwidth, latency, etc.). The method further allows for the mapping of the configuration of the application and LwM2M server to the constrained devices (for example, the conditional notification attributes pmin, or pmax with sampling rates of the device).

Figure 3:
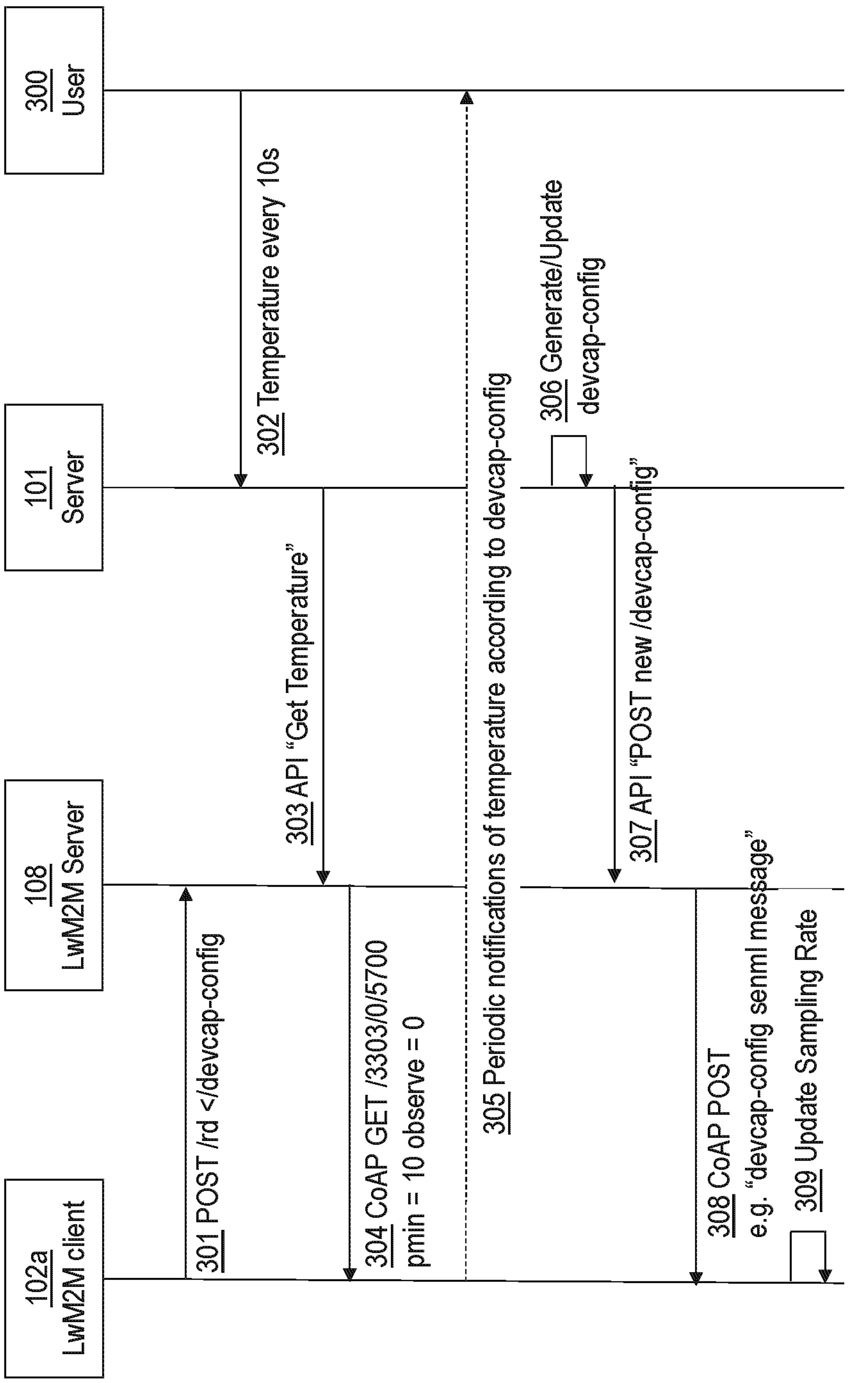
FIG. 3 illustrates an example implementation of the method of FIG. 2.

FIG. 3 illustrates an example implementation of the method of FIG. 2. In this example, the method of FIG. 2 is performed by the server 101. It will be appreciated that the server 101 may be implemented as illustrated in FIG. 1. LwM2M is used as an example protocol in the description of this figure.

It will be appreciated that the method of FIG. 3 omits message acknowledgements and other non-relevant messages for clarity.

In step 301, a constrained device 102*a*, e.g. an LwM2M client, registers on the LwM2M server 108. In this example, the LwM2M client 102*a* is preconfigured with at least one DEVCAP_CONFIG instance for a particular parameter. It will however be appreciated that in some examples, the DEVCAP_CONFIG instance will have been generated by the server 101 in a previous process (for example as described with reference to FIG. 4). Step 301 may therefore comprise registering the DEVCAP_CONFIG instance with the L2M2M server 108.

In this example, the LwM2M client 102*a* comprises a temperature sensor unit 103 that is using a specific sampling rate, e.g. 10 Hz according to the DEVCAP_CONFIG instance. This information is only stated in the manufacturer's datasheet or MEDS for the temperature sensor unit 103 and it is not expressed in a LwM2M Object.

In step 302, a user logs into the system and, for example, through an API requests to receive notifications of the temperature every 10 seconds.

In step 303, the request is translated into an API call (for example using server-side events over HTTP) and transmitted to the LwM2M server 108.

The LwM2M server 108 may then translate the API call into, for example, a CoAP observe message with a parameter indicating that the minimum period (pmin) between notifications of the temperature is 10 seconds. The CoAP observe message may then be transmitted to the LwM2M client 102*a* in step 304. This sets the LwM2M client 102*a* to send notifications at least every 10 seconds.

In step 305, the LwM2M client 102*a* transmits periodic notifications of the temperature to the user 300 according to the preconfigured DEVCAP_CONFIG. In other words, these periodic notifications are transmitted with a sampling rate of 10 Hz.

The server 101 monitors the interactions between the LwM2M client 102*a* and the user 300. In particular, as described above, the server 101 may receive indications of the current state of the system (e.g. the vector state).

The server 101 may then determine that the current state of the system is not optimal in relation to the intent of the user and the capabilities of the LwM2M client 102*a*. In particular, the server 101 may perform step 202 of FIG. 2 and may obtain first information relating to available settings for the temperature sensor unit, wherein the first information is derived from a manufacturer's electronic data sheet, MEDS, for the temperature sensor unit. It will be appreciated that the server 101 may obtain this information from the MEDS Repository 104 as illustrated in FIG. 1.

This MEDS file may state that the LwM2M client 102*a* is capable of utilizing a temperature sampling rates 1 Hz, 10 Hz, 100 Hz, and 1000 Hz. Based on this information gleaned from the MEDS, the server 101 may realize that the LwM2M client 102*a* is currently operating in a non-optimal manner. For example, an intent of the operator of the LwM2M client 102*a* may state that battery life is to be conserved where possible. Combining this intent with the intent of the user 300 to receive temperature notifications every 10 seconds, the server 101 may conclude that the LwM2M client is not fulfilling both intents as it is wasting battery life by sending temperature measurements more often than required when a lower sampling rate is available.

In step 306, the server 101 may therefore write to existing instance of DEVCAP_CONFIG in order to change the sampling rate of the temperature sensor unit to 1 Hz.

In step 307, the server 101 uses the same interface with the LwM2M as used in step 303 to transmit a POST message comprising the update to the existing DEVCAP_CONFIG instance. Step 307 may be considered equivalent to step 203 of FIG. 2.

In step 308, the LwM2M server translates the POST message into a CoAP message (for example a SenML message) and transmits the CoAP message to the LwM2M client.

In step 309, based on the updated DEVCAP_CONFIG instance the temperature sensor unit changes the temperature sampling rate to 1 Hz.

It will therefore be appreciated, that by utilising the first information derived from a manufacturer's electronic data sheet, MEDS, for the temperature sensor unit, the server 101 is able to optimize the performance of the sensor more successfully than if it were unaware of the possible settings that that particular temperature sensor unit were able to use.

Figure 4:
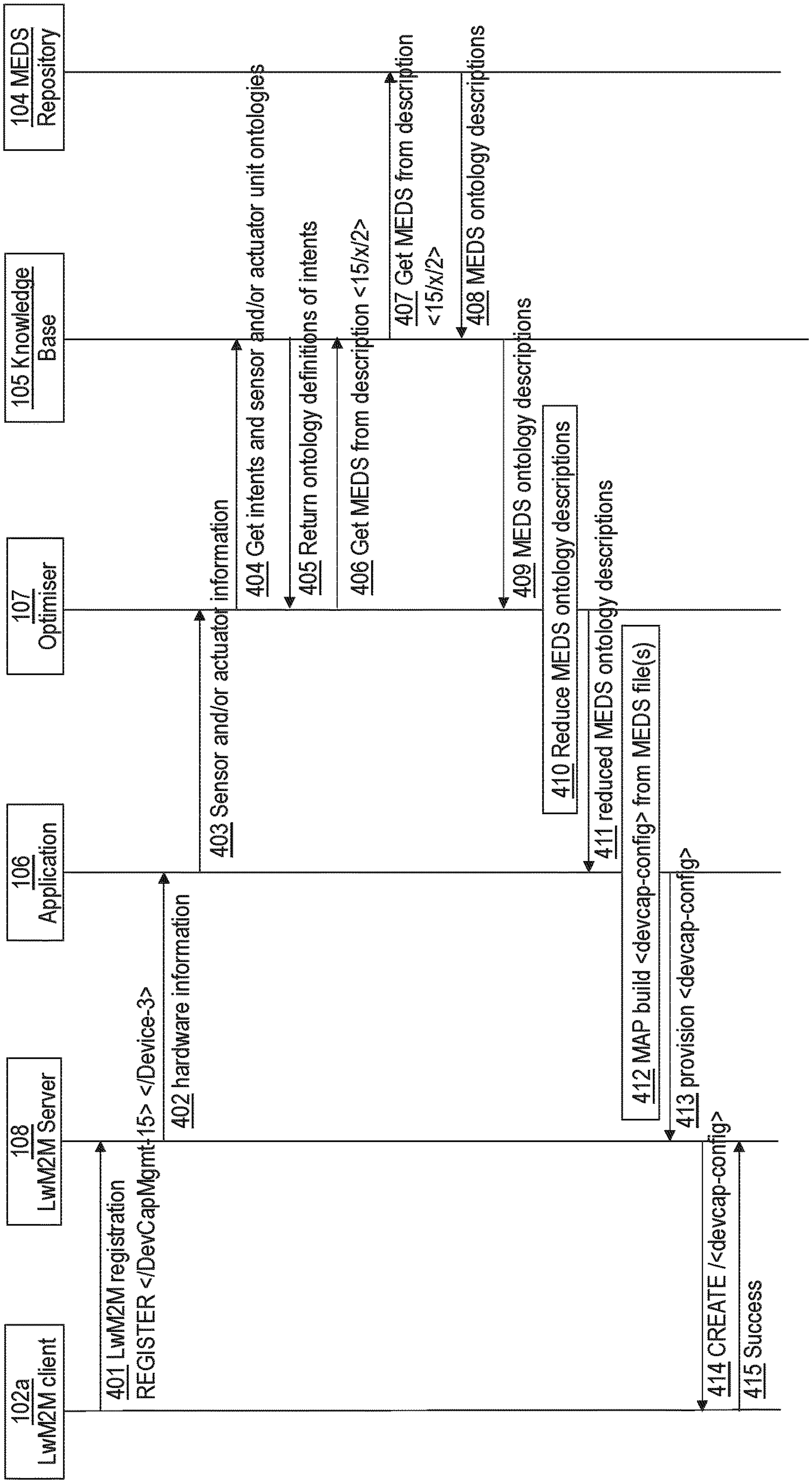
FIG. 4 illustrates an example implementation of the method of FIG. 2.
Figure 4:
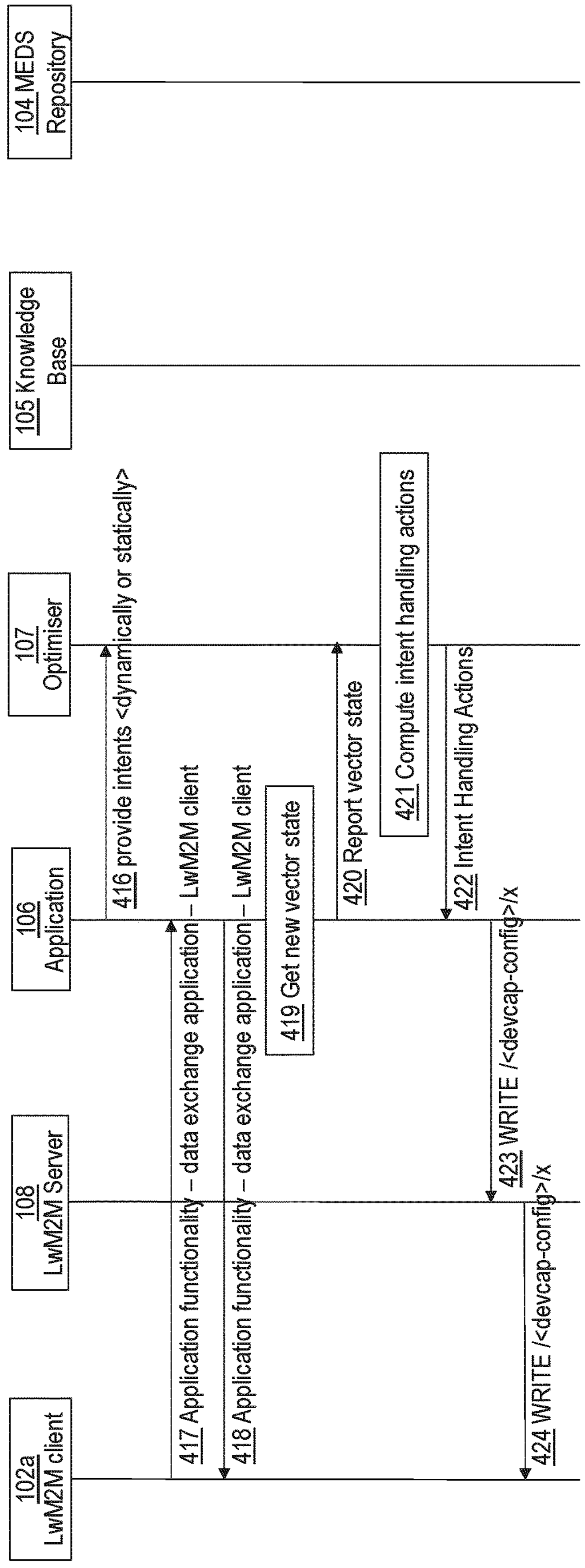

FIG. 4 illustrates an example implementation of the method of FIG. 2. In this example, the server 101 is specified as comprising: the application 106, the optimiser 107, the knowledge base 105 and the MEDS repository 104. LwM2M is used as an example protocol in the description of this figure.

It will be appreciated, as previously mentioned, that some or all of these elements of the server 101 may be implemented as part of a single network node.

In step 401, the LwM2M client 102*a* transmits a registration request to the LwM2M server 108. In this registration request, the LwM2M client 102*a* provides its hardware information. The hardware information may comprise information relating to one or more sensor and/or actuator units that are controlled by the LwM2M client 102*a*. The hardware information may be provided in Internet Protocol for Smart Objects (IPSO) objects. For example, a DevCapMgmt resource (e.g. object (/15)), with one instance per device, sensor or actuator unit (e.g. each instance of DevCapMgmt may be represented by/15/x, where x=1 . . . N where N is the number of sensor and actuators units controlled by the L2M2M client 102*a*).

The resource/15/x/1 may indicate the type of actuator and/or sensor, and the resource/15/x/2 may provide a description of the actuator and/or sensor unit.

For example, for a 2-wire serial temperature sensor, the resource/15/x/2 may be "TCN75A".

A device object/3 provides the information about the constrained device that the LwM2M client 102*a* is running one. The device object/3 may for example provide information relating to the manufacturer, model/serial number, firmware, and/or hardware/software version of the constrained device.

For example, the hardware information for the Thingy91 from Nordic Semiconductors may comprise:

| |
|---|
| "/3/0/0" (Device - Manufacturer) - Nordic Semiconductors |
| "/3/0/1" (Device - Model number) - nRF52840 |
| "/3/0/2" (Device - Serial number) - asdf-ghjl-jklm |
| "/3/0/3" (Device - Firmware version) - nRF52840_1.1.2 |
| "/3/0/17" (Device - Device Type) - Cellular IoT |
| "/3/0/18" (Device - Hardware version) - Model A |
| "/3/0/19" (Device - Software version) - Zephyr_.v2.6.0 |
| "/15/0/1" (DevCapMgmt - Group) - 2: CONNECTIVTY |
| "/15/0/2" (DevCapMgmt - Description) - nRF9160 |
| "/15/1/1" (DevCapMgmt - Group) - 2: SENSOR |
| "/15/1/2" (DevCapMgmt - Description) - ADXL372 |
| "/15/2/1" (DevCapMgmt - Group) - 2: SENSOR |
| "/15/2/2" (DevCapMgmt - Description) - BME680 |

It should be noted that not all sensors/actuators of the Thingy91 are listed for the sake of clarity.

In step 402, the LwM2M server 108 passes the hardware information to the application 106.

In step 403, the application 106 extracts information relating to what sensor and/or actuator units are available at the LwM2M client 102*a* from the hardware information. For example, the application 106 may extract the descriptions from the DevCapMgmt objects. For example, the application 106 may extract the following information:

| |
|---|
| /15/0/2 - nRF9160 |
| /15/1/2 - ADXL372 |
| /15/2/2 - BME680 |

This extracted information may then be forwarded to the optimiser 107.

In step 404, the optimiser 107 triggers the creation of the knowledge base 105. The knowledge base 105 may therefore be triggered to obtain ontology definitions for both the intents associated with the LwM2M client 102*a* (e.g. application/operator/user intents), and the ontology definitions for the sensor and/or actuator units of the LwM2M client 102*a*.

The ontology definitions of the intents may be returned to the optimiser 107 in step 405. In this example it is assumed that the intents have been previously provisioned to the knowledge base 105. An example of have an intent may be defined using an ontology is given with reference to step 416 later. It will be appreciated that any suitable method for providing an intent in an ontology definition may be used.

In particular, in order to allow the knowledge base 105 to acquire the appropriate information for the sensory and/or actuator units of the LwM2M client 102*a*, the optimiser 107 may, in step 406, transmit the information received in step 403 to the knowledge base 105. For example, step 406 may comprise the optimiser 107 transmitting the descriptions from the DevCapMgmt objects to the knowledge base 105.

The knowledge base 105 may then obtain first information relating to the available settings for the one or more sensor and/or actuator units of the LwM2M client 102*a* (e.g. the sensor and/or actuator units indicated in the received descriptions of step 405).

In the example illustrated in FIG. 4, the knowledge base 105 utilises the descriptions of the sensor and/or actuator units received in step 406 to retrieve the first information from a MEDS repository 104 (e.g. in steps 407 and 408). In this example, the first information may comprise one or more ontology definitions for the available settings of the one or more sensor and/or actuator units. In other words, the ontology definitions may be determined based on the MEDs for the one or more sensor and/or actuator units.

In some examples, however, the knowledge base 105 may utilise the descriptions of the sensor and/or actuator units received in step 406 to download a predefined DEVCAP_CONFIG instance from a DEVCAP repository. This predefined DEVCAP_CONFIG instance may have been previously created from MEDS files. In this example therefore the first information comprises a predetermined configuration (e.g. the predefined DEVCAP_CONFIG instance) for the one or more sensor and/or actuator units, wherein the predetermined configuration is determined based on the MEDs for the one or more sensor and/or actuator units. The DEVCAP repository may be built based on existing device/sensor/actuator units, and it may map each of the device/sensor/actuator unit capabilities to a DEVCAP_CONFIG instance. In these examples, the first information may comprise a predefined DEVCAP_CONFIG instance In some examples, for example as described with reference to FIG. 3, the LwM2M client 102 may already have a DEVCAP_CONFIG instance defined. In these examples, the steps 412 to 415 of the method of FIG. 4 may not be executed.

In some examples, it will be appreciated that the knowledge base 105 may already have one or more relevant ontology definitions stored, and may therefore not need to retrieve all or any of the ontology definitions for the relevant MEDS files.

The ontology definitions for both the intents and the sensors/actuators may therefore be obtained either directly from the knowledge base 105 or from external servers, such as the MEDS Repository 104.

In the example of FIG. 4, in step 407 the knowledge base 105 transmits a request to the MEDS repository 104 for the ontology definition associated with the sensor and/or actuator units having the descriptions/<15/x/2.

In step 408, the MEDS repository 104 returns the ontology descriptions of the relevant MEDS files for the sensor and/or actuator units having the descriptions/<15/x/2.

As previously described the ontology definitions may comprise SensorML ontologies and defined using RDF or OWL. For example, for the description ADXL372 the MEDS file ontology definition may comprise the following:

```
  <sml:capabilities name="specifications">
    <sml:CapabilityList>
      <sml:capability name="measurementProperties">
        <swe:DataRecord
definition="http://sensorml.com/ont/swe/property/MeasurementProperties">
          <swe:label>Measurement Properties</swe:label>
          <swe:field name="OperationMode">
            <swe:Text
definition="http://sensorml.com/ont/swe/property/OperationMode">
              <swe:constraint>
                <swe:AllowedValues>
                  <swe:value>STAND_BY</swe:value>
                  <swe:value>WAKE_UP</swe:value>
                  <swe:value>INSTANT_ON</swe:value>
                  <swe:value>FULL_BW_MEASUREMENT</swe:value>
                </swe:AllowedValues>
              </swe:constraint>
            </swe:Text>
          </swe:field>
          <swe:field name="Bandwidth">
            <swe:Quantity
definition="http://sensorml.com/ont/swe/property/Bandwidth">
              <swe:uom code="Hz"/>
              <swe:constraint>
                <swe:AllowedValues>
                  <swe:value>200</swe:value>
                  <swe:value>400</swe:value>
                  <swe:value>800</swe:value>
                  <swe:value>1600</swe:value>
                  <swe:value>3200</swe:value>
                </swe:AllowedValues>
              </swe:constraint>
            </swe:Quantity>
          </swe:field>
          <swe:field name="ODR">
            <swe:Quantity
definition="http://sensorml.com/ont/swe/property/OutputDataRate">
              <swe:uom code="Hz"/>
              <swe:constraint>
                <swe:AllowedValues>
                  <swe:value>400</swe:value>
                  <swe:value>800</swe:value>
                  <swe:value>1600</swe:value>
                  <swe:value>3200</swe:value>
                  <swe:value>6400</swe:value>
                </swe:AllowedValues>
              </swe:constraint>
            </swe:Quantity>
          </swe:field>
          <swe:field name="Activity Timer">
            <swe:Quantity
definition="http://sensorml.com/ont/swe/property/ActivityTimer">
              <swe:uom code="ms"/>
              <swe:value>1</swe:value>
            </swe:Quantity>
          </swe:field>
          <swe:field name="InactivityTimer">
            <swe:Quantity
definition="http://sensorml.com/ont/swe/property/InactivityTimer">
              <swe:uom code="ms"/>
              <swe:value>1</swe:value>
            </swe:Quantity>
          </swe:field>
          <swe:field name="Threshold">
            <swe:Text
definition="http://sensorml.com/ont/swe/property/Threshold">
              <swe:constraint>
                <swe:AllowedValues>
                  <swe:value>LOW</swe:value>
                  <swe:value>HIGH</swe:value>
```

-continued

```
                </swe:AllowedValues>
              </swe:constraint>
            </swe:Text>
          </swe:field>
        </swe:DataRecord>
      </sml:capability>
    </sml:CapabilityList>
  </sml:capabilities>
```

It will be appreciated that this ontology definition for the sensor ADXL372 is simplified for the sake of clarity, and therefore not all available settings for all parameters of the ADXL372 are listed.

It will be appreciated that the knowledge base 105 may therefore collect together ontology definitions for all of the one or more sensor and/or actuator units of the LwM2M client 102*a*.

In step 409, the knowledge base 105 forwards the ontology definitions for the one or more sensor and/or actuator units to the optimiser 107.

In step 410, the optimiser 107 may then, in some embodiments, reduce the first information (e.g. the ontology definitions received in step 409) based on second information relating to the application 106 that is utilizing the LwM2M client 102*a*. The second information may comprise one or more of: an intent of the application 106, historical data (for example historical vector states or historical observations or metrics of the system) relating to the application 106, and information relating to which one or more parameters of the one or more sensor and/or actuator units are tunable.

For example, step 410 may comprise the optimiser 107 reducing the number of MEDS files to send to the application 106. In other words, the optimiser 107 may be aware that the application 106 is only utilizing certain capabilities of the LwM2M client 102*a*. The optimiser 107 may therefore reduce the first information such that ontology definitions that are not relevant to the capabilities to be used by the application 106 are removed. This will effectively reduce the number of DEVCAP_CONFIG instances that need to be created in the constrained devices.

For example, given the constrained device, Thingy91, as described above, MEDS files may be available for (at least) both sensor units ADXL372 and BME680. However, the optimiser 107 may be aware that based on the current data/information stored relating to the application 106, there are no references to use of the BME680 sensor unit. Therefore, the optimiser 107 may conclude that the application 106 does not require the ontology definition for the BME680 sensor unit, as it will not be making use of the BME680 sensor unit.

It will be appreciated that one or more of: the intents, historical data and/or what parameters and/or sensor units are tunable may be utilized to determine how the first information (e.g. the ontology definitions of the MEDS files) may be reduced by the optimiser 107.

In some examples, the optimiser 107 may further determine that only some of the capabilities of a sensor unit that are listed in a particular ontology definition of a MEDS file should be sent on to the application 106. For example, the optimiser 107 may be aware that the application is only utilizing particular capabilities of a particular sensor unit or may be aware that only certain parameters of a particular sensor unit are tunable.

For example, for ontology definition of the ADXL372 MEDS file as given above, the optimiser 107 may determine that only the information relating to the “output data rate” parameter is relevant to the application 106.

In step 411, the optimiser 107 transmits the reduced first information to the application. In examples in which the method of FIG. 2 is performed by the optimiser 107, step 411 may correspond to step 203.

For example, for the reduced ontology definition for MEDS file of the ADXL372, the optimiser 107 may transmit the following information to the application 106:

```
<sml:capabilities name=“specifications”>
    <sml:CapabilityList>
      <sml:capability name=“measurementProperties”>
        <swe:DataRecord
definition=“http://sensorml.com/ont/swe/property/MeasurementProperties”>
          <swe:label>Measurement Properties</swe:label>
          <swe:field name=“ODR”>
            <swe:Quantity
definition=“http://sensorml.com/ont/swe/property/OutputDataRate”>
              <swe:uom code=“Hz”/>
              <swe:constraint>
                <swe:AllowedValues>
                  <swe:value>400</swe:value>
                  <swe:value>800</swe:value>
                  <swe:value>1600</swe:value>
                  <swe:value>3200</swe:value>
                  <swe:value>6400</swe:value>
                </swe:AllowedValues>
              </swe:constraint>
            </swe:Quantity>
          </swe:field>
        </swe:DataRecord>
      </sml:capability>
    </sml:CapabilityList>
  </sml:capabilities>
```

Step 411 may also comprise the optimiser 107 transmitting the information relating to one or more intents associated with the application 106 and/or the one or more sensor and/or actuator units (e.g. ontology definitions) to the application 106.

In this example, the intents may comprise an intent of an operator that states that the one or more sensor and/or actuator units should be operated with as low a power output as possible.

In step 412, the application 106 may determine the configurations of each of the one or more sensor and/or actuator units based on the first information. For example, the application 106 may utilize the first information or reduced first information to generate a DEVCAP_CONFIG instance for each parameter in the first information.

For example, the application 106 may select a value for each parameter in order to satisfy the intents.

For the example given above for the ADXL372, as the reduced ontology definition for MEDS file only comprises information relating to one parameter (the "output data rate" parameter) only one instance of DEVCAP_CONFIG is created.

For example, the DEVCAP_CONFIG instance for the "output data rate" parameter may comprise the following information:

| | |
|---|---|
| +--ro DEVCAP_CONFIG*[0] | |
| +--rw instance number | 0 |
| +--roConfigName | output data rate |
| +--ro ConfigValue | 400 |
| +--ro QuantityRangeType | array[float] |
| +--ro QuantityRange | 400, 800, 4600, 3200, 6400 |
| +--ro ConfigFunction | adxl372_Set_ODR |
| +--ro DevCapMgmt | '/15/1/' |

Note that the above example of a DEVCAP_CONFIG instance does not comprise any valid serialization, but is a text representation of the information that may be provided by a DEVCAP_CONFIG instance.

The application 106 provisions the configurations for the one or more sensor and/or actuator units (e.g. the DEVCAP_CONFIG instances) to the LwM2M client 102*a*. In some examples, the provisioning of the configurations may be performed via a proxy server (e.g. LwM2M server 108).

For example, the application 106 may transmit the DEVCAP_CONFIG instances to the LwM2M server 108 in step 413.

In step 414, the LwM2M server 108 may then transmit a creation call to the LwM2M client 102*a*.

For example, the following represents an example payload of a creation call according to step 414 serialized in json+senml:

```
//json+senml
[{"bn": "devcap-config/0", n":"0", "vs":"output data rate"},
{"n":"1", "v":400},
{"n":"2", "vs": "array[float]"},
{"n":"3", "vd":[400,800,4600,3200,6400]},
{"n":"4", "vs": "adsl372_Set_ODR"},
{"n":"5", "vlo":15:1}]
```

The above example corresponds with the example for the DEVCAP_CONFIG instance for "output data rate" given above.

In step 415, the LwM2M client 102*a* indicates that the DEVCAP_CONFIG instance has been created successfully.

It will be appreciated, that in some examples, the application 106 or any other external entities (e.g. a user or operator of the application) may be able to modify the intents dynamically, so that the server 101 may provide the a set of configurations (e.g. new or updated DEVCAP_CONFIG instances) for the whole system and the constrained devices. In practice, there may be a set of portals (UIs) (e.g. for customers, businesses, or operations) and APIs, that will allow the different stakeholders to perform updates to the intents.

In other words, the optimiser 107 may, in some examples, obtain third information relating to an intent for the application 106 which is used in the LwM2M client 102*a*. This third information may comprise information relating to an updated or changed intent. The third information may, for example, be obtained from one or more of: user of the application 106 (e.g. a customer of business) or an operator of the application 106, or the application 106 itself.

For example, in step 416, the application 106 provides an updated intent to the optimiser.

The following provides an example of an intent definition (in turtle serialisation) which aims to maintain a healthy communications link to the LwM2M client 102*a* whilst conserving energy:

```
:IoTApplicationIntent
  a iot: DeviceCommuicationIntent ;
  rdfs:comment "Example of IoT application to keep healthy
communication link and energy consumption" ;
  cc:hasExpectation
    [ a cc:MinMetricExpectation ;
      cc:target iot:OutputDataRate ;
      cc:params [
        swe:value 400 ;
      ]
    ],
    [ a cc:MaxMetricExpectation ;
      cc:target iot:lwm2mServerLink ;
      cc:params [
        tel:throughput 200 ;
        tel:latency 60 ;
      ]
    ],
    [ a cc:MaxMetricExpectation ;
    cc:target iot:energyConsumption ;
      cc:params [
        iot:power 10
      ]
    ].
```

In this example, the intent is stating a minimum expected output data rate of 400 Hz, a maximum throughput on a link to the L2M2M client of 200 Mbps, a maximum latency of the link of 60 ms, and a maximum power consumption of the constrained device running the L2M2M client of 20 mW.

In steps 417 and 418 the application 106 and LwM2M client 102*a* execute the application 106 and data is exchanged between the LwM2M client 102*a* and the application 106 (via the LwM2M server 108).

In parallel to the execution of the application 106 in steps 417 and 418, an intent-handling re-configuration (e.g. the provision of an updated or new DEVCAP_CONFIG instance) may be implemented (as described with reference to steps 419 to 424). This re-configuration may be triggered periodically, by a change of intent (for example indicated in step 416), or when a state vector (as described with reference to step 419) indicates that a value of a parameter at the LwM2M client 102*a* has crossed a predefined threshold value.

In this example, in step 419, the application retrieves a report of a new vector state associated with application 106 and/or the LwM2M client 102*a*. In other words, the application 106 receives an indication of at least one performance metric (e.g. Key Performance Indicator (KPI)) associated with the application 106 and/or the LwM2M client 102*a*.

For example, a example vector state may comprise the following information:

{"lwm2mServerLink": {"throughput": 1, "latency": 10}, "device1": {"power": 1, "OutputDataRate": 400}}.

It will be appreciated that a vector state may comprise further information relating to other metrics associated with the application 106 and/or the LwM2M client 102*a*, and to the sensor and/or actuator units of the LwM2M client 102*a*.

In step 420, the application 106 reports the new vector state to the optimiser 107.

In step 421, the optimiser 107 determines the one or more intent handling actions based on the third information (e.g. the intent received in step 416), the first information (e.g. the ontology definitions of the MEDS files), and in some examples, the at least one performance metric e.g. the vector state) received in step 420. In some examples, the optimiser 107 may further consider historical performance metrics associated with the application 106 and/or the LwM2M client 102*a* in the determination of the one or more intent handling actions.

In some examples, the optimiser 107 may be triggered to determine the one or more intent handling actions responsive to determining that the vector state received in step 420 indicates that one or more intents are not being met. In some examples, the determination of intent handling actions may be performed periodically based on one or more of: first information, third information and current and/or historical performance metrics associated with the application 106 or the LwM2M client 102*a*.

In some examples, the optimiser 107 may be triggered to determine the one or more intent handling actions responsive a change in the intent of the application (which may for example be indicated by the receipt of an intent in step 416).

For example, where the optimiser 107 receives the example intent given above with reference to step 416 and receives the example vector state given above with reference to step 419, the optimiser 107 may determine that the parameter "output data rate" may be increased as the link is performing better than is expected by the intent.

The optimiser 107 may therefore review the ontology definition of the MEDS file for the ADXL372 and may determine that the next highest "output data rate" that the ADXL372 may use is "800" Hz. The optimiser 107 may therefore determine that the output data rate of the ADXL372 should be updated to "800" Hz.

In this example therefore, the one or more intent handling actions may comprise an action to increase the value of the parameter "output data rate" in the ADXL372 sensor unit.

In step 422, the optimiser initiating re-configuration of the at least one of the one or more sensor and/or actuator units based on the intent handling actions. In this example, step 422 is performed by transmitting the one or more intent handling actions to the application 106.

In step 423, the application 106 determines a new configuration for the one or more sensor and/or actuator units based on the intent handling actions. For example, the application may determine an updated or new DEVCAP_CONFIG instance for each parameter affected by the one or more intent handling actions.

For the specific example relating to the ADXL372, the application 106 may determine to write to the existing DEVCAP_CONFIG instance for the "output data rate" parameter at the ADXL372 in order to implement the intent handling action.

For example, a JSON and SENML representation of the provisioning of this new configuration to the LwM2M server 108 may be expressed as:

[{"bn":"devcap-config/0"}, {"n":"1", "v":800}]

The application 106 may then provision the new configuration to the LwM2M server 1908 in step 423. In step 424, the LwM2M server may then pass the new configuration to the LwM2M client 102*a*, which may update the parameters of the constrained device running the LwM2M client 102*a* accordingly.

Figure 5:
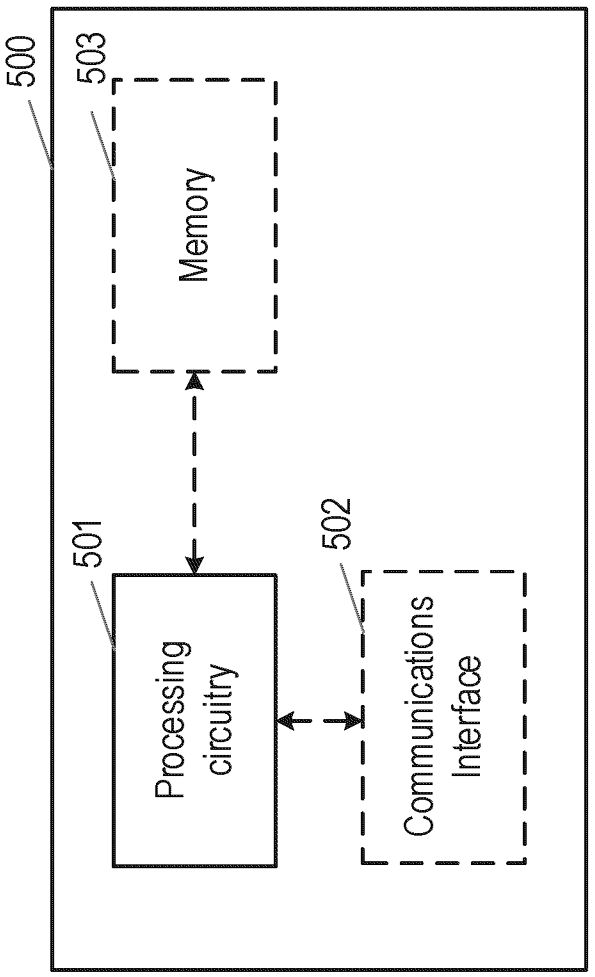
FIG. 5 illustrates a server comprising processing circuitry (or logic)

FIG. 5 illustrates a server 500 comprising processing circuitry (or logic) 501. The processing circuitry 501 controls the operation of the server 500 and can implement the method described herein in relation to an server 500. The processing circuitry 501 can comprise one or more processors, processing units, multi-core processors or modules that are configured or programmed to control the server 500 in the manner described herein. In particular implementations, the processing circuitry 501 can comprise a plurality of software and/or hardware modules that are each configured to perform, or are for performing, individual or multiple steps of the method described herein in relation to the server 500.

Briefly, the processing circuitry 501 of the server 500 is configured to: obtain an indication of one or more sensor and/or actuator units at a first constrained device; obtain first information relating to available settings for the one or more sensor and/or actuator units of the first constrained device, wherein the first information is derived from manufacturer's electronic data sheets, MEDs, for the one or more sensor and/or actuator units; and initiate configuration of at least one of the one or more sensor and/or actuator units based on the first information.

In some embodiments, the server 500 may optionally comprise a communications interface 502. The communications interface 502 of the server 500 can be for use in communicating with other nodes, such as other virtual nodes. For example, the communications interface 502 of the server 500 can be configured to transmit to and/or receive from other nodes requests, resources, information, data, signals, or similar. The processing circuitry 501 of server 500 may be configured to control the communications interface 502 of the server 500 to transmit to and/or receive from other nodes requests, resources, information, data, signals, or similar.

Optionally, the server 500 may comprise a memory 503. In some embodiments, the memory 503 of the server 500 can be configured to store program code that can be executed by the processing circuitry 501 of the server 500 to perform the method described herein in relation to the server 500. Alternatively or in addition, the memory 503 of the server 500, can be configured to store any requests, resources, information, data, signals, or similar that are described herein. The processing circuitry 501 of the server 500 may be configured to control the memory 503 of the server 500 to store any requests, resources, information, data, signals, or similar that are described herein.

Figure 6:
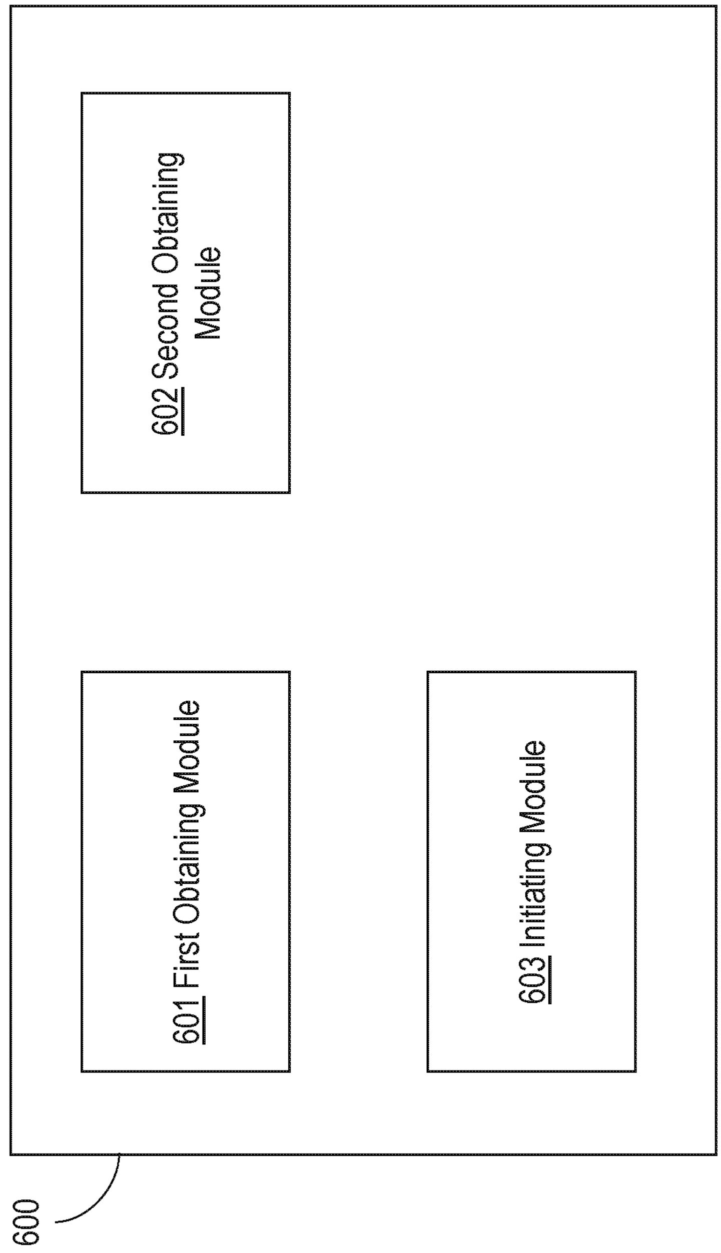
FIG. 6 is a block diagram illustrating an apparatus in accordance with an embodiment.

FIG. 6 is a block diagram illustrating an apparatus 600 in accordance with an embodiment. The apparatus 600 is for use in configuring constrained devices in a system. The apparatus 600 comprises a first obtaining module 601 configured to obtain an indication of one or more sensor and/or actuator units at a first constrained device. The apparatus 600 further comprises a second obtaining module 602 configured to obtain first information relating to available settings for the one or more sensor and/or actuator units of the first constrained device, wherein the first information is derived from manufacturer's electronic data sheets, MEDs, for the one or more sensor and/or actuator units. The apparatus 600 further comprises an initiating module 603 configured to initiate configuration of at least one of the one or more sensor and/or actuator units based on the first information. The apparatus 600 may operate in the manner described herein in respect of an apparatus (for example a server or an optimiser).

There is also provided a computer program comprising instructions which, when executed by processing circuitry (such as the processing circuitry 501 of the server 500 described earlier, cause the processing circuitry to perform at least part of the method described herein. There is provided a computer program product, embodied on a non-transitory machine-readable medium, comprising instructions which are executable by processing circuitry to cause the processing circuitry to perform at least part of the method described herein. There is provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

Embodiments described herein therefore provide a method and a server capable of configuring and tuning with fine granularity the parameters of sensor and/or actuator units at constrained devices based on the MEDS files for those sensor and/or actuator units. In particular, a LwM2M object DEVCAP_CONFIG may be used to perform the configuration of the constrained devices.

Embodiments described herein therefore allow for more optimal configuration of sensor and/or actuator units in a constrained device to the particular application of such a constrained device.

In particular, the creation of the proposed DEVCAP_CONFIG object enables for each of the constrained devices and its sensor/actuator units to expose the description of the configuration settings and their valid values; and provides a channel to modify the configuration and parameter settings on the device.

The embodiments described herein further allow for the tuning and configuration of a constrained device and its sensor and/or actuator units to fulfil intents (energy, precision, accuracy, bandwidth, latency, etc.)

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, performed by a server, for use in configuring constrained devices in a system, the method comprising:

obtaining an indication of one or more sensor and/or actuator units at a first constrained device;

obtaining first information relating to available settings for the one or more sensor and/or actuator units of the first constrained device, wherein the first information is derived from manufacturer's electronic data sheets (MEDS) for the one or more sensor and/or actuator units and wherein the first information comprises ontology definitions for the available settings of the one or more sensor and/or actuator units;

reducing the first information, based on second information relating to an application that is utilizing the first constrained device such that ontology definitions that are not relevant to the capabilities to be used by the application are removed; and initiating configuration of at least one of the one or more sensor and/or actuator units, based on transmitting the reduced first information to the application.

2. The method as claimed in claim 1, wherein the step of obtaining the first information comprises retrieving the first information from a MEDs repository.

3. The method as claimed in claim 1, wherein the ontology definitions are determined based on the MEDs for the one or more sensor and/or actuator units.

4. The method as claimed in claim 1, wherein the second information comprises one or more of: an intent of the application, historical data relating to the application, and information relating to which one or more parameters of the one or more sensor and/or actuator units are tunable.

5. The method as claimed in claim 1, wherein the application determines the configurations of each of the one or more sensor and/or actuator units based on the reduced first information and provisions the configurations to the first constrained device via a proxy server.

6. The method as claimed in claim 1, wherein the second information indicates an intent of the application with respect to utilizing the first constrained device, and wherein the method further comprises subsequently obtaining third information indicating an updated intent of the application for utilizing the first constrained device, the third information obtained from one or more of: the application, a user of the application, an operator of the application.

7. The method as claimed in claim 6, further comprising determining one or more intent handling actions based on the third information and the first information.

8. The method as claimed in claim 7, further comprising initiating re-configuration of the at least one of the one or more sensor and/or actuator units based on the one or more intent handling actions, and wherein the step of initiating re-configuration comprises:

determining a new configuration for the one or more sensor and/or actuator units based on the one or more intent handling actions; and provisioning the new configuration to the first constrained device.

9. The method as claimed in claim 7, further comprising:

receiving an indication of a performance metric associated with the application and/or the first constrained device; and determining the one or more intent handling actions based on the performance metric.

10. The method as claimed in claim 9, wherein the step of determining one or more intent handling actions is performed responsive to the performance metric indicating that the intent for the application is not being met.

11. The method as claimed in claim 7, wherein the step of determining one or more intent handling actions is performed periodically, based on updated values of the performance metric.

12. The method as claimed in claim 1, wherein the first constrained device comprises a LwM2M client.

13. The method as claimed in claim 1, wherein the available settings comprise possible values for one or more parameters associated with the one or more sensor and/or actuator units.

14. An apparatus for use in configuring constrained devices in a system, the apparatus comprising processing circuitry and a memory, said memory containing instructions executable by said processor controls the apparatus to:

obtain an indication of one or more sensor and/or actuator units at a first constrained device;

obtain first information relating to available settings for the one or more sensor and/or actuator units of the first constrained device, wherein the first information is derived from manufacturer's electronic data sheets, MEDs, for the one or more sensor and/or actuator units and wherein the first information comprises ontology definitions for the available settings of the one or more sensor and/or actuator units;

reduce the first information, based on second information relating to an application that is utilizing the first constrained device such that ontology definitions that are not relevant to the capabilities to be used by the application are removed; and initiate configuration of at least one of the one or more sensor and/or actuator units, based on transmitting the reduced first information to the application.

* * * * *